United States Patent [19]

Seely

[11] Patent Number: 4,544,125

[45] Date of Patent: Oct. 1, 1985

[54] SIGN BRACKET

[75] Inventor: James R. Seely, Rochester, Mich.

[73] Assignee: Marketing Displays, Inc., Farmington Hills, Mich.

[21] Appl. No.: 442,419

[22] Filed: Nov. 17, 1982

[51] Int. Cl.[4] .............................................. F16M 13/00

[52] U.S. Cl. ........................................ 248/624; 40/602; 40/608; 40/611; 248/121; 248/407

[58] Field of Search ............... 248/166, 170, 160, 161, 248/624, 407, 599, 600, 601, 354.5, 125, 124, 121, 122; 40/602, 606, 607, 608, 611, 612; 292/219, 228; 403/108, 109, 330, 395, 398, 399

[56] References Cited

U.S. PATENT DOCUMENTS

| | | | |
|---|---|---|---|
| 1,420,268 | 6/1922 | LaHodny . | |
| 1,764,071 | 7/1930 | Foulke . | |
| 1,854,478 | 4/1932 | Meyers . | |
| 1,972,959 | 9/1934 | Taylor . | |
| 2,167,564 | 7/1939 | Fonda | 248/407 X |
| 2,172,282 | 9/1939 | Hopp . | |
| 2,592,386 | 4/1952 | Breakey . | |
| 2,719,688 | 10/1955 | Seifert | 248/188.5 |
| 2,815,594 | 12/1957 | Heselov . | |
| 2,847,776 | 8/1958 | Robertson . | |
| 2,849,202 | 8/1958 | McCombs . | |
| 3,164,354 | 1/1965 | Murdock . | |
| 3,171,179 | 3/1965 | Lee . | |
| 3,256,594 | 6/1966 | Howard et al. . | |
| 3,287,840 | 11/1966 | Keats | 40/607 X |
| 3,310,901 | 3/1967 | Sarkisian . | |
| 3,384,348 | 5/1968 | Wicker . | |
| 3,458,945 | 8/1969 | Edwards . | |
| 3,521,390 | 7/1970 | Carlson . | |
| 3,526,200 | 9/1970 | Doyle | 40/606 X |
| 3,535,807 | 10/1970 | Baldwin . | |
| 3,620,496 | 11/1971 | Boh et al. . | |
| 3,646,696 | 3/1972 | Sarkisian . | |
| 3,662,482 | 5/1972 | Sarkisian . | |
| 3,683,527 | 8/1972 | Gilman . | |
| 3,899,843 | 8/1975 | Doyle et al. | 40/612 X |
| 3,910,614 | 10/1975 | Coe | 292/219 |
| 4,033,536 | 7/1977 | Hillstrom . | |
| 4,265,040 | 5/1981 | Sarkisian . | |
| 4,288,053 | 9/1981 | Sarkisian . | |
| 4,368,586 | 1/1983 | Forzelias . | |
| 4,433,935 | 2/1984 | Main et al. | 248/125 X |

FOREIGN PATENT DOCUMENTS

| | | | |
|---|---|---|---|
| 0078520 | 5/1983 | European Pat. Off. . | |
| 1269369 | 5/1968 | Fed. Rep. of Germany | 248/121 |
| 768730 | 2/1934 | France | 40/607 |
| 1286852 | 1/1962 | France . | |
| 1289175 | 2/1962 | France | 403/108 |
| 72532 | 9/1947 | Norway . | |
| 323967 | 1/1930 | United Kingdom . | |
| 790068 | 2/1958 | United Kingdom . | |
| 865044 | 4/1961 | United Kingdom . | |
| 1117283 | 6/1968 | United Kingdom . | |
| 1133297 | 11/1968 | United Kingdom . | |
| 1267932 | 3/1972 | United Kingdom . | |
| 1299642 | 12/1972 | United Kingdom . | |
| 1311582 | 3/1973 | United Kingdom . | |
| 1404624 | 9/1975 | United Kingdom . | |
| 2023694A | 1/1980 | United Kingdom . | |
| 2056738A | 3/1981 | United Kingdom . | |
| 1601142 | 10/1981 | United Kingdom . | |

*Primary Examiner*—J. Franklin Foss
*Assistant Examiner*—David L. Talbott
*Attorney, Agent, or Firm*—Harness, Dickey & Pierce

[57] ABSTRACT

An improved sign bracket is disclosed, which includes apparatus for mounting the bracket on a sign stand and mechanism for attaching and retaining the sign to the bracket. The preferred attachment mechanism includes at least one channel member and a resiliently pivotal latching member that cooperate to partially circumscribe a cross-brace on the sign. The pivotal latching member also preferably permits the sign to laterally pivot under side-wind loads so that a resilient portion of the sign stand deflects generally along a predetermined plane to substantially prevent the sign and stand assembly from tipping over.

24 Claims, 10 Drawing Figures

SIGN BRACKET

BACKGROUND AND SUMMARY OF THE INVENTION

The present invention relates to adjustable sign brackets for sign and poster display devices of all kinds. The invention more particularly relates to brackets for securely holding roll-up and flexible signs in place on construction-type sign standards.

Numerous sign stands and poster display devices known today are used for displaying various signs and messages for conveying advertisements and information to the public. On construction sites, for example, such signs are typically positioned on sign standards that are either anchored in the ground, held in place by sand-bags or other heavy objects, or spring-mounted on bases which allow them to bend or deflect generally along a predetermined plane, without tipping over, under high wind forces. Spring-mounted sign stands which can be used for this purpose are shown in U.S. Pat. Nos. 3,646,696; 3,662,482; 4,033,536; 4,265,040; and 4,288,053; as well as in two copending patent applications entitled "Compact Sign And Stand", and "Improved Deflectable Sign And Stand", filed on the same date as the application herein, and in a previously filed copending application, Ser. No. 274,400, filed June 17, 1981, all of said copending applications being assigned to the same assignee as the invention herein. The deflectable sign stands, although unanchored and lightweight, prevent tipping over or sliding of the units in virtually all weather and wind conditions.

Signs commonly used at construction sites are square or diamond in shape, flat in configuration, made of metal or wood, and have pertinent informative or warning messages or symbols on them. The wood and metal signs are bulky and heavy, causing numerous problems in storage, transportation and mounting, and to overcome these problems, flexible roll-up type signs are being used more and more frequently today. These flexible signs are also typically diamond-shaped signs but are made out of a heavy-duty flexible and foldable material, such as vinyl, or reinforced cloth or plastic. Such signs are lighter and thus easier to handle than metal or wood signs and are also typically adapted to be rolled-up or folded-up for ease of transportation and storage.

The flexible or roll-up signs have one disadvantage when used with unanchored resiliently mounted sign stands. Although such signs work very satisfactorily when the wind forces are directed generally transversely to the plane of the sign, the flexible signs have a tendency to make the unanchored sign stands unstable when the wind forces are generally parallel to the plane of the sign.

The above-discussed roll-up signs typically have one or more relatively rigid cross-braces to hold them in their fully extended configurations, with brackets or other mounting means on sign stands for holding the signs in place. The cross-braces are elongated members, typically made of wood, fiberglass or a similar strong material, and are connected to one another in the middle so that they can be rotated together for storage. Examples of brackets used for mounting roll-up signs on sign stands are found in U.S. Pat. No. 4,288,053; as well as in the above-mentioned copending patent application, Ser. No. 274,400, filed June 17, 1981, which is assigned to the same assignee as the invention herein.

Some of the brackets presently in use for mounting roll-up signs, however, are often difficult and time-consuming to operate, are difficult to accurately position on the standard, and may not prevent the sign from coming off under severe weather conditions.

It is an object of the present invention to provide an improved sign bracket for holding and securing signs on sign stands having upright or pole-type frame members. It is a further object to provide an improved sign bracket which overcomes the problems previously experienced with existing adjustable signs and brackets. A further object is to provide a sign bracket that has the particular capability of quick and easy mounting or attachment of a roll-up or other flexible-type sign on the frame member of a sign stand. A still further object is to provide a sign stand bracket which securely holds a roll-up type sign in place regardless of orientation of the sign stand, regardless of wind conditions, and regardless of wind direction.

In accordance with the invention, an adjustable sign bracket includes a sign attachment mechanism and apparatus for securing the bracket to a sign frame member or pole. The sign bracket mechanism comprises at least one channel member adapted to hold a cross-brace from a preferred roll-up type sign. At least one latching member is adapted to extend across, and to cooperate with, the channel member in order to at least partially circumscribe a sign cross-brace positioned in the channel member, thereby holding or retaining the cross-brace in place and preventing the cross-brace from being accidentally removed from the channel member. In the preferred embodiment, the latching member is pivotally attached to the bracket and resiliently biased into the cooperating relationship with the channel member.

A sign stand according to the invention also preferably has an upstanding frame member that is resiliently deflectable relative to a ground-engaging base along a predetermined plane in response to wind forces directed generally transverse to the plane of the sign. The sign attachment mechanism is preferably adapted to permit or cause the sign to pivot or swing laterally about a generally vertical axis in response to side-wind forces directed generally parallel to the plane of the sign. Such pivotal movement of the sign causes a portion of the wind forces to be oriented generally transverse to the sign and permits or causes the frame member to deflect generally along the above-mentioned predetemined plane, thereby preventing the sign stand from tipping over. The latching member of the present invention is particularly adapted to retain the sign's cross-brace in the channel member during such lateral pivotal movement of the sign.

Other objects, features and advantages of the present invention will become apparent from the following description and claims taken in conjunction with the accompanying drawings.

DETAILED DESCRIPTION OF THE PREFERRED EMBODIMENTS

Figure 1:
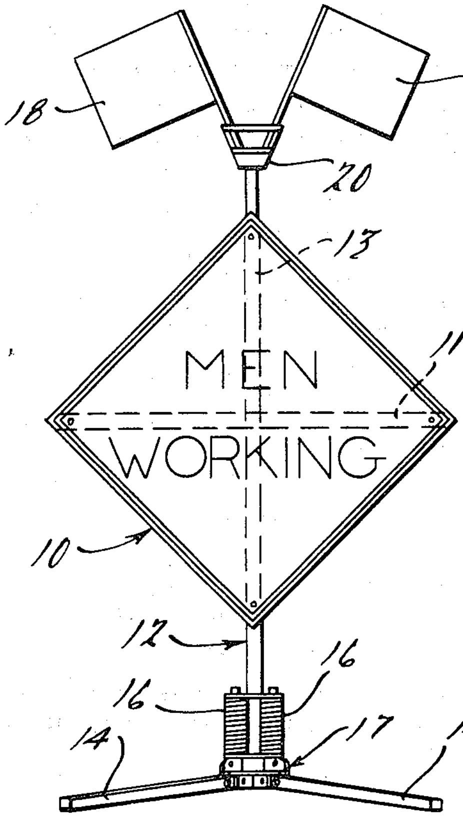
FIG. 1 is a front view of a construction-type sign stand.

FIGS. 1 through 10 show an exemplary embodiment of the present invention for purposes of illustration only. One skilled in the art will readily recognize that the principles of the invention are well-adapted for application to devices other than sign and stand assemblies as well as to sign and stand assemblies other than that shown in the drawings.

Figure 2:
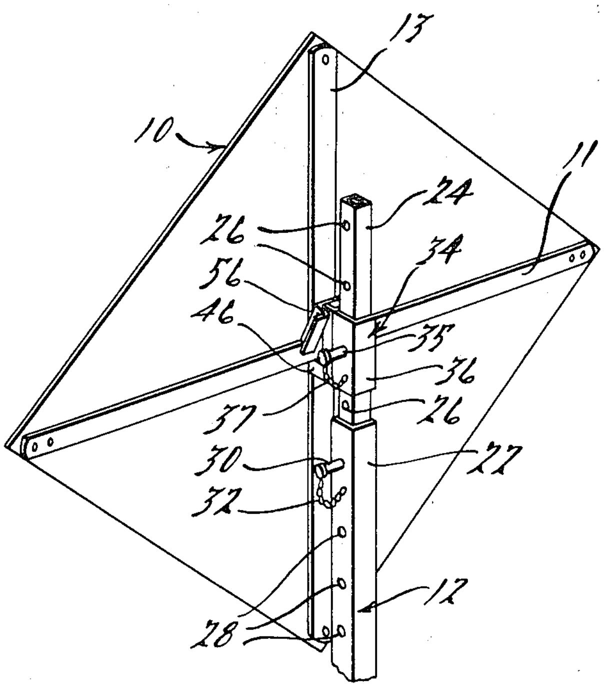
FIG. 2 is a partial rear perspective view of the construction sign shown in FIG. 1, depicting an adjustable sign bracket according to the present invention.
Figure 3:
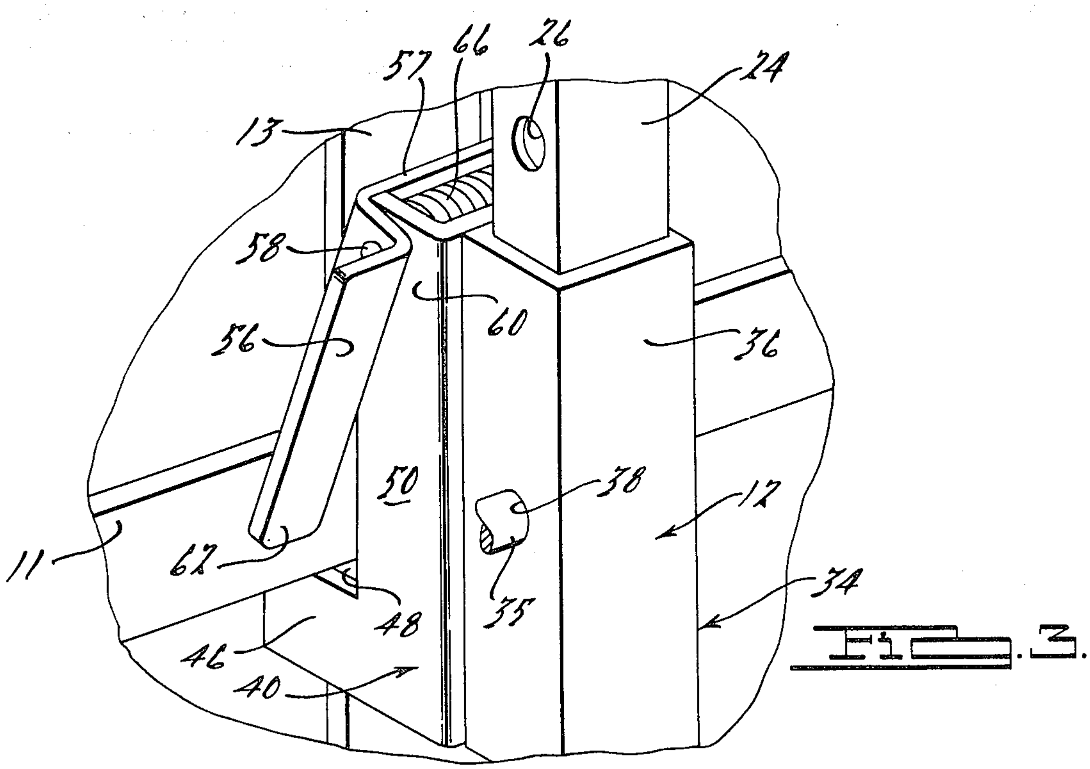
FIG. 3 is an enlarged rear view, with the portions cut away, of the sign bracket portion of FIG. 2.

FIGS. 1 through 3 show the inventive sign attachment bracket in use on a construction sign, with the construction sign 10 mounted on an upright sign frame or pole 12. The frame 12 is supported on the ground preferably by a plurality of ground-engaging legs 14 and a pair of coil springs 16 which allow the sign 10 and frame 12 to deflect relative to a base assembly 17 in a downward direction when subjected to wind forces and then resiliently return to their normal upright position shown in FIG. 1. Spring-mounted sign stands which can be used for this purpose are disclosed in the above-mentioned U.S. Pat. Nos. 3,646,696; 3,662,082; 4,033,536; 4,265,040; and 4,288,053; and in the above-mentioned copending applications, which are assigned to the same assignee as the invention herein. It is understood, of course, that the present mounting bracket may also be used with other types of sign stands or frame members, whether permanently anchored or portable, and whether spring-mounted or rigidly mounted.

The top of the frame 12 may optionally include a plurality of warning flags 18 held in place by a flag bracket 20. As is commonly known in the construction industry, the flags 18 are used as a high-level warning for approaching traffic.

As shown in FIGS. 2 and 3, the frame 12 may optionally be telescopic and include two sections, a larger lower section 22 and a smaller upper section 24. The upper section 24 is adapted to slidably extend and retract inside the lower section 22 and has a plurality of holes 26 which align with corresponding holes 28 in the lower section 22 so that the sections can be held in place at the desired extended or retracted position by a pin 30 which is insertable through aligned pairs of holes 26 and 28. The pin 30 is attached to portion 22 of the frame 12 by a chain 32 or other similar retainer means so that the pin 30 will not be lost or misplaced when removed from the holes. Alternatively, the frame may have a one-piece construction (not shown), if the above-discussed telescopic feature is neither necessary nor desired.

The frame 12 may be composed of any conventional material which is sturdy enough to be used for the purpose described herein, but is preferably composed of a hollow metal construction, such as aluminum or steel. Hollow frames made from extruded aluminum material have provided very satisfactory performance. The cross-sectional shape of the frame 12 is preferably square (as shown in FIGS. 2 and 3), although it should be understood that the frame can have any suitable cross-sectional size and shape so long as it can be used as a stand for a construction sign or similar display.

The sign 10 has a large flexible and foldable sign panel with a warning, message or symbol on one side and a pair of cross-braces 11 and 13 pivotally attached to each other on the other side. The flexible sign panel is preferably composed of a heavy-duty material such as vinyl or reinforced cloth or plastic, for example. The cross-braces are made of a relatively rigid material (such as fiberglass, metal or wood) and serve to brace and support the flexible sign panel in its fully extended position. As shown in FIGS. 2 and 3, one of the cross-braces 11 is pivoted to a horizontal position when the sign is mounted on the frame 12, while the other cross-brace 13 is vertically situated. Any of several attaching means known in the art may be used to retain the corners of the sign panel at the ends of the cross-braces 11 and 13 in order to erect the sign to its display configuration. When the sign 10 is removed from the frame member 12 and is to be taken down, at least two of the corners of the flexible sign panel material are detached from the ends of their corresponding cross-brace, and the cross-braces are pivoted to a generally parallel, mutually-aligned relationship. The flexible sign panel material, which remains attached to one of the cross-braces, may then be folded or rolled up around the mutually-aligned cross-braces for compact, convenient storage.

The sign 10 is held in place on the sign stand or frame 12 by an adjustable sign bracket 34. As shown in FIGS. 2 through 7 and 9, the bracket preferably includes a sleeve-type bracket mounting member 36 that is hollow and adapted to slidingly fit over the frame 12. The cross-sectional size and shape of the sleeve member 36 should preferably correspond to the cross-sectional size and shape of the frame 12.

The sleeve member 36 includes a pin 35 attached thereto by a chain 37 or other similar means to prevent the pin 35 from being lost or misplaced. The pin 35 may be inserted through an aligned pair of holes 38 in the sleeve member and through any of the various aligned holes 26 on the upper section of the frame 12 in order to selectively position the bracket 34 at the desired vertical height. It should be noted that the number and spacing of the holes 26 and 28 on the upper and lower sections of the frame 12 will, of course, depend upon the desired use of the sign stand.

As is also illustrated in FIGS. 3 through 7 and 9, the sign bracket 34 includes sign attachment means 40 fixedly secured to the sleeve member 36. The sign attachment means 40 preferably includes a pair of channel members 46 protruding in an outward direction from the sleeve member 36. Each of the channel members 46 includes an inner leg 50 spaced apart from an outer leg 52, with the inner and outer legs being interconnected by a base member 54. The channel spaces 48 in each of the channel members 46 are aligned with each other such that the horizontal cross-brace 11 may be positioned in the channel spaces 48 in order to mount the sign on the sign bracket 34.

Figure 4:
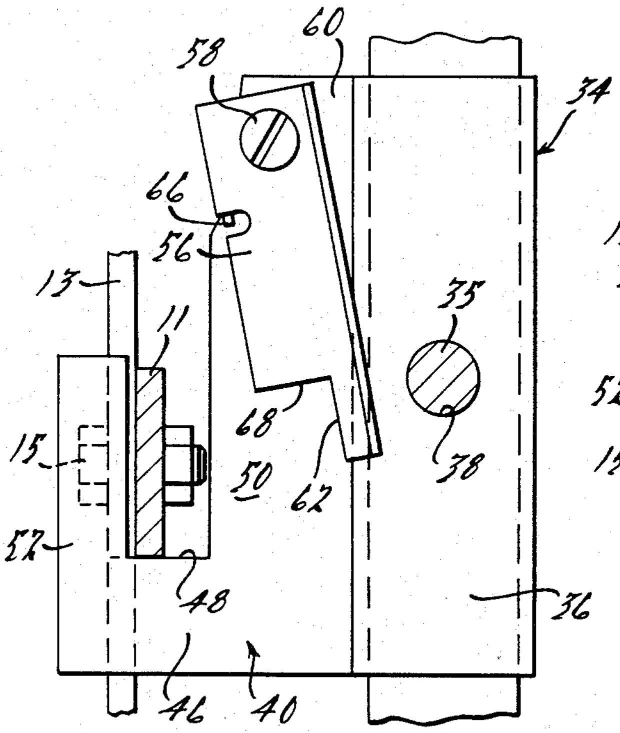
FIG. 4 is a side view of the sign bracket of FIG. 2, illustrating a latching member pivoted to an open position.
Figure 5:
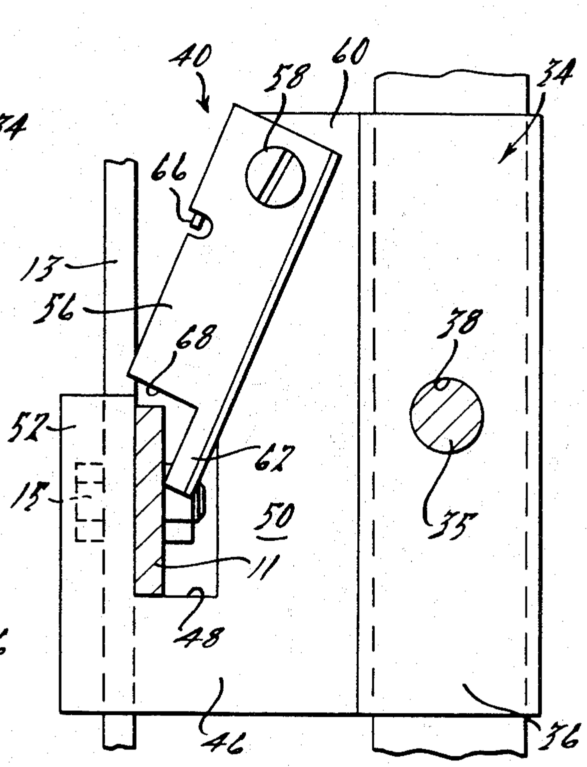
FIG. 5 is a view similar to FIG. 4, but with the latching member pivoted to a closed, sign-retaining position.
Figure 6:
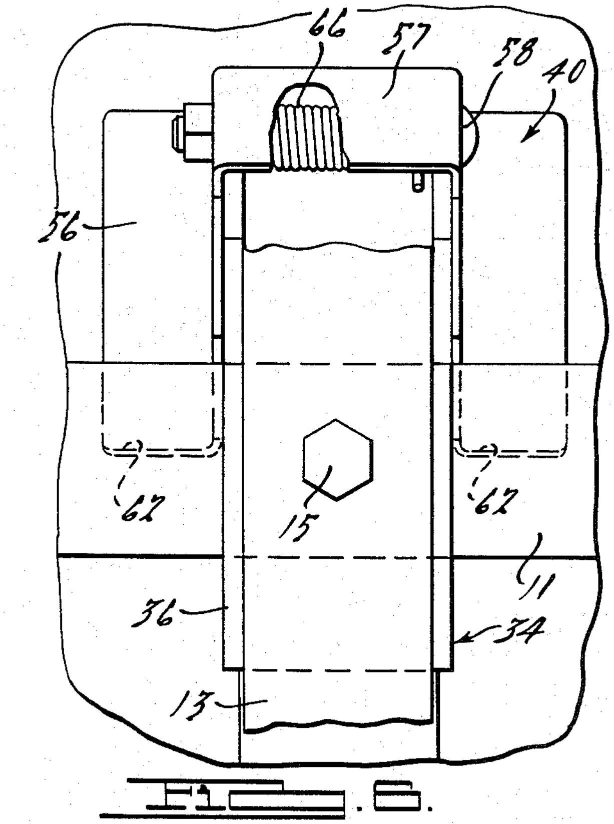
FIG. 6 is a front view of the sign bracket of FIG. 2.
Figure 7:
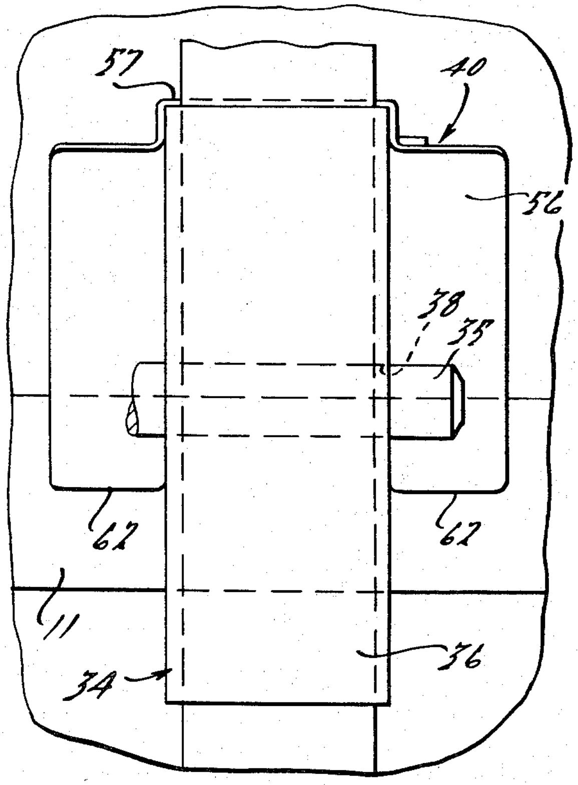
FIG. 7 is a rear view of the sign bracket of FIG. 2.

As shown in FIGS. 4 and 5, a pair of latching members 56 are preferably interconnected by a bridge portion 57 for pivotal movement with one another about a pivot pin 58 extending through apertures in the latching member and in an upper bracket portion 60. A biasing spring 66, which is preferably a torsion-type spring, surrounds the pivot pin 58 and includes end protuberances that engage the bridge portions 57 and the upper portion of the base member 54 to resiliently bias the latching members away from their open position shown in FIG. 4 and toward the outer legs 52 as shown in FIG. 5. An abutment portion 62 at the lower end of each of the latching members 56 cooperates with the biasing spring 66 to resiliently urge the horizontal cross-brace 11 against the outer legs 62 when the latching members 56 are in the closed position shown in FIG. 5. In such closed position, the latching members 56 and the channel members 46 at least partially circumscribe the horizontal cross-brace 11 to retain the cross-brace in the channel spaces 48. Although the above described interconnected latching members are preferred, separate latching members may alternatively be employed.

It should be noted that when the latching members 56 are in their above-described closed position, as perhaps best shown in FIG. 5, the lower edges 68 of the latching members 56 are disposed above the upper edge of the cross-brace 11. By such a relationship, the latching members 56 prevent the cross-brace from being lifted or otherwise moving upwardly, under the influence of wind gusts, for example, and thus escaping from the channel spaces 48. As is shown in FIG. 9, this relationship between the cross-brace 11 and at least one of the latching members 56 is maintained even when the sign 10 pivots or swings laterally in response to side-directed wind loads, as described below and shown in FIG. 9.

The sign attachment means 40 of the sign bracket 34 also facilitates the quick and easy attachment and removal of the sign 10 from the sign stand assembly. In order to attch the sign to the sign bracket 34, the latching members 56 are pivoted inwardly against the force of the biasing spring 66 as shown in FIG. 4. The cross-brace 11 is then merely inserted or positioned into the channel spaces 48 in the channel members 46. The latching members 56 are then released, and the latching members 56 pivot outwardly under the force of the biasing spring 66 to engage and circumscribe the cross-brace 11, as shown in FIG. 5, thereby retaining the cross-brace in the channel spaces 48. Alternatively, the cross-brace 11 may be urged in a generally inward and downward direction against the outer edges of the latching members 56 in order to forcibly pivot the latching members inwardly against the force of the biasing spring 66. The cross-brace 11 then slides downwardly along the outer edges of the latching members and into the channel spaces 48. Once the cross-brace passes below the lower edges 68 of the latching members, the latching members automatically pivot or "snap" outwardly under the force of the biasing spring 66 to engage and circumvent the cross-brace as shown in FIG. 5.

In order to remove the sign 10 from the sign bracket 34, the latching members 56 are manually pivoted inwardly against the force of the biasing spring 66, as shown in FIG. 4, and the cross-brace 11 is merely lifted out from the channel spaces 48. Once the cross-brace 11, and thus the sign 10 have been removed, the latching members 56 may be released to be biasingly pivoted outwardly by the biasing spring 66.

Figure 8:
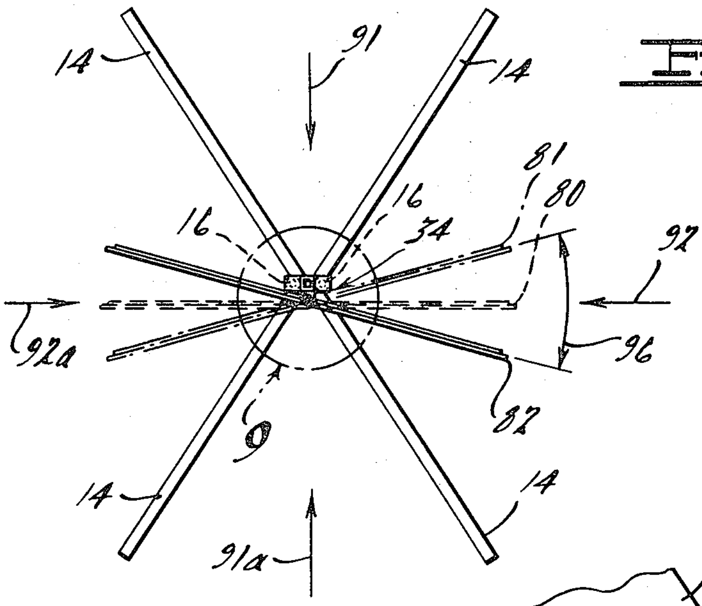
FIG. 8 is a top view of the sign and bracket assembly of FIG. 1, illustrating the lateral pivotal movement of the sign.
Figure 9:
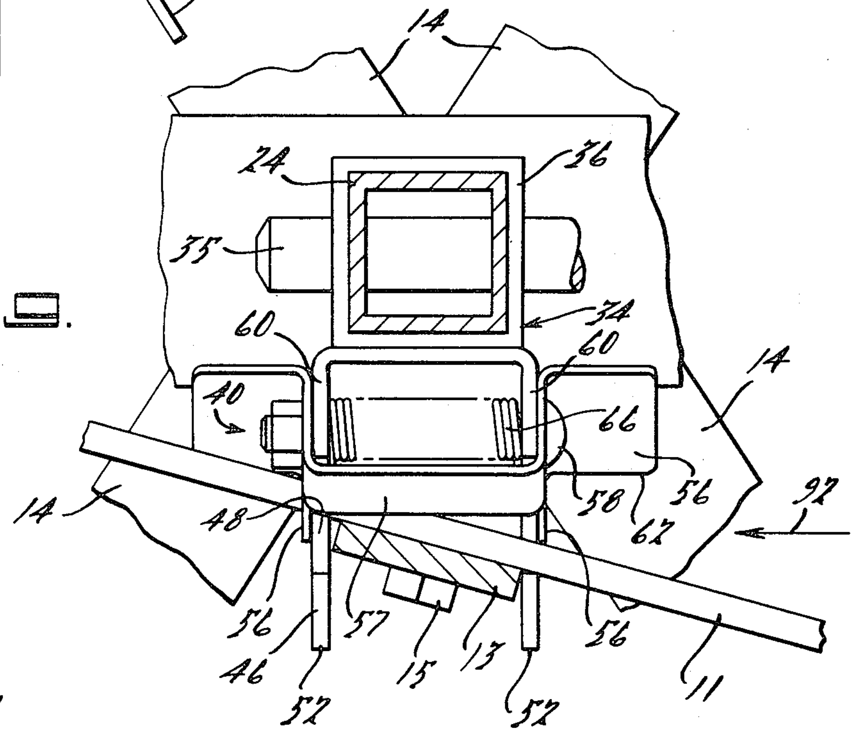
FIG. 9 is an enlarged view of the circled portion of FIG. 8.
Figure 10:
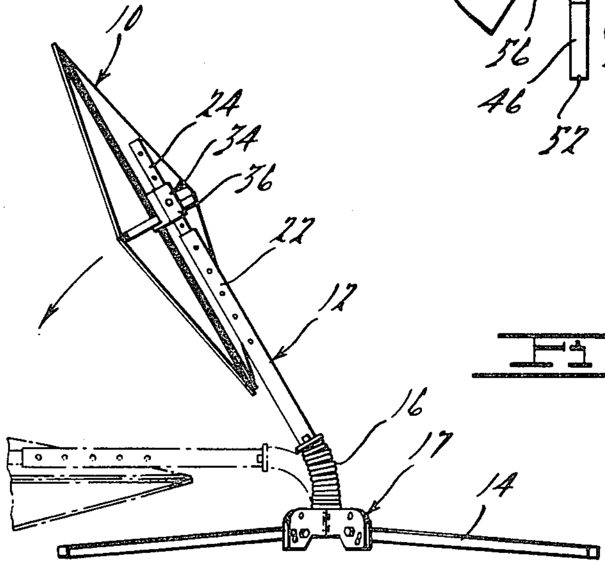
FIG. 10 is a side view of the sign and bracket assembly of FIG. 1, illustrating the frame member in a partially downwardly-deflected position.

Referring to FIGS. 8 through 10, the coil springs 16 provide a resilient connection between the frame 12 and the base assembly 17 such that the frame 12 is resiliently deflectable generally along a predetermined plane, which is generally perpendicular to the plane of the sign when the sign is in its normal orientation 80 shown in FIG. 8. Such deflection occurs in response to the first wind forces that are exerted on the sign in a direction generally transverse to the plane of the sign panel, such as those illustrated by reference numerals 91 or 91*a*, for example. It should be understood, however, that such transversely-directed first wind forces need not be exerted in a direction perpendicular to the plane of the sign (when in its normal sign plane orientation 80) in order to cause such deflection of the coil springs 16. It is sufficient that such transversely-directed wind forces have enough of a force vector component in a direction perpendicular to the normal sign orientation 80 such that the coil springs 16 may be caused to deflect.

Spring mounted sign stands in accordance with the above-identified patents preferably have the ability to deflect to a point where the sign 10 is generally parallel to the ground (as shown in FIG. 10). In order to insure that the sign and stand assembly do not tip over in side-wind loading conditions, such as the second wind forces 92 or 92*a* exerted in a direction generally parallel to the normal sign plane orientation 80, the sign bracket 34 preferably includes means for allowing the sign to pivot or swing laterally about a generally vertical axis. Such capability allows the pivoted sign to assume sign orientations such as those illustrated by reference numerals 81 and 82 in FIG. 8.

In the preferred embodiment, such means for allowing such lateral pivotal or swinging sign movement is provided by the channel spaces 48, which are sufficiently wider in the inner and outer directions than the cross-brace 11 to allow the cross-brace to pivot about a generally vertical axis as illustrated in FIGS. 9 and 10. As is discussed above and further shown in FIG. 9, the resilient biasing of the latching members 56 toward the outer legs 52 maintains at least one of the latching members in the above-described circumscribing relationship with the cross-brace 11 during such pivoting of the sign. The resilient biasing spring 66 is thus sufficiently stiff to maintain such relationship, but resiliently yieldable enough to allow such lateral pivotal or swinging movement of the cross-brace 11 and the sign 10.

When the sign 10 pivots or swings laterally about a generally vertical axis to a transverse orientation relative to side-directed winds, as discussed above, the second wind forces (such as 92 or 92*a*) have a force vector component exerted against the sign in a direction sufficiently transverse to the sign such that the coil springs 16 may resiliently deflect the frame 12 along the above-described predetermined plane as shown in FIG. 10. The biasing springs 66 and the coil springs 16 are selected with appropriate spring constants such that sufficient lateral pivotal movement of the sign occurs to cause or allow the resultant deflection of the frame member to occur before the sign and stand assembly can tip over under the second wind forces. Although the exact range of pivotal swinging movement of the sign depends upon several factors such as the sign size and weight and the spring constants, for example, a range of pivotal or swinging sign movement through a total arc 96 (as shown in FIG. 8) of approximately 10–35 degrees, and preferably through an arc of approximately 15 degrees to either side of the normal sign plane orientation, has been found to provide satisfactory results. Either smaller or larger ranges of pivotal or swinging movement may also be sufficient to cause or allow the desired frame deflection depending upon the particular application of the principles of the invention.

As shown and described above, the present invention provides a sign bracket that provides for simple, quick and easy attachment and removal of signs on frames of sign stands. The present invention also provides a sign bracket that functions to minimize the possibility of a sign stand assembly with a roll-up sign from tipping over in high winds from a side direction.

The parts of the sign mounting bracket are preferably made of steel or aluminum, but can be made of any material which is strong enough to withstand the forces construction signs are normally exposed to in use.

Although the present invention is described above as being used for flexible or roll-up type signs of diamond shape, it is apparent that the sign bracket can be used with a wide variety of signs of different materials, rigid or soft, and with signs of widely varying sizes and shapes. With rigid signs, a flange or protruding member at least functionally similar to the cross-brace 11 should be provided and should be adapted to fit within the channel spaces 48 on the bracket 34.

The foregoing discussion discloses and describes merely exemplary embodiments of the present invention. One skilled in the art will readily recognize from such discussion that various changes, modifications and variations may be made therein without departing from the spirit and scope of the invention as defined in the following claims.

What is claimed is:

1. A bracket for mounting a sign on a sign stand, said sign having at least one mounting means thereon and said stand including a base and an upstanding member connected to said base, said bracket comprising:

bracket mounting means for mounting said bracket on said upstanding member of said stand;

sign attachment means for selectively attaching said sign mounting means to said bracket and for selectively releasing said sign mounting means from said bracket, said sign attachment means including a pair of channel members spaced apart from each other and in which said sign mounting means can be received and positioned, a pair of latching means each adapted to cooperate with an associated one of said channel members to at least partially circumscribe said sign mounting means in order to retain said sign mounting means in said channel member; and said latching means being pivotally relative to said bracket for selective pivotal movement into and out of said cooperating and circumscribing relationship with said channel members, said sign attachment means further including resilient biasing means for biasing said pivotal latching means into said cooperating and circumscribing relationship with said channel member, said resilient biasing means and said latching means being adapted to resiliently allow pivotal movement of said sign while maintaining at least one of said latching means in said partially circumscribing relationship with said sign mounting means.

2. A bracket according to claim 1, wherein each of said channel members has a generally vertical inner leg and a generally vertical outer leg spaced apart and interconnected by a base member, each of said latching means being pivotaly attached to one of said legs of its associated channel members for pivotal movement between a first position wherein said latching means extends across the space between said associated legs in said cooperating relationship with said associated channel member and a second position wherein each of said latching means is spaced apart from the other of said associated legs.

3. A bracket according to claim 2, wherein each of said latching means is pivotally attached to said inner leg of its associated channel member, said resilient biasing means biasing said latching means toward said outer leg of its associated channel member, each of said latching means further including an abutment portion thereon adapted for abutting engagement with said sign mounting means, said abutment portions and said resilient biasing means cooperating to resiliently urge said sign mounting means against said outer legs when said latching means are in said first position and said sign mounting means is positioned between said inner and outer legs of said channel members.

4. A bracket for mounting a sign stand, said sign having at least one mounting means thereon and said stand including a base and an upstanding frame member connected to said base, said bracket comprising:

bracket mounting means for mounting said bracket on said stand;

sign attachment means for attaching said sign mounting means to said bracket, said sign attachment means including at least one channel member in which said sign mounting means can be positioned, at least one latching means adapted to cooperate with said channel member to at least partially circumscribe said sign mounting means in order to retain said sign mounting means in said channel member;

said latching means being pivotally attached to said bracket for pivotal movement into and out of said cooperating relationship with said channel member, said sign attachment means further including resilient biasing means for biasing said pivotal latching means toward said cooperating relationship with said channel member;

said channel member having a generally vertical inner leg and a generally vertical outer leg, said legs being spaced apart and interconnected by a base member, said latching means being pivotally attached to one of said legs for pivotal movement between a first position wherein said latching means extend across the space between said legs in said cooperating relationship with said channel member and a second position wherein said latching means is spaced apart from the other of said legs;

said latching means being pivotally attached to said inner leg, said resilient biasing means biasing said latching means towards said outer leg, said latching means further including an abutment portion thereon adapted for abutting engagement with said sign mounting means, said abutment portion and said resilient biasing means cooperating to resiliently urge said sign mounting means against said outer leg when said latching means is in said first position and said sign mounting means is positioned between said inner and outer legs; and said sign attachment means includes a pair of said channel members spaced apart from each other, a pair of said latching means, each of said latching means being pivotally attached to the inner leg of one of said channel members, said resilient biasing means and said latching means being adapted to resiliently allow said pivotal lateral movement of said sign while maintaining at least one of said latching means in said partially circumscribing relationship with said sign mounting means.

5. A bracket according to claim 4, wherein said sign mounting means comprises a horizontal cross member connected to said sign, said horizontal cross member being adapted to fit between said inner and outer legs with sufficient clearance to allow said pivotal lateral movement of said sign.

6. A bracket according to claim 5, wherein said sign is pivotal through a total arc of approximately thirty degrees.

7. A bracket according to claim 5, wherein said frame member is resiliently deflectable relative to said base generally along a predetermined plane in response to first wind forces exerted generally transverse to the plane of said sign, said latching means is adapted to permit said sign to pivot laterally about a generally vertical axis in response to second wind forces exerted generally parallel to the plane of said sign, said pivoted sign being oriented generally transverse relative to said second wind forces in order to permit said frame member to deflect generally along said predetermined plane, said latching means maintaining said cooperating relationship to retain said sign mounting means in said channel member during said lateral pivotal movement of said sign.

8. In a bracket for mounting a sign on a stand, said sign having at least one sign mounting means thereon, said bracket being adapted to be secured to said stand, the improvement wherein said bracket includes sign attachment means for attaching said sign mounting means to said bracket, said sign attachment means including:

at least one channel member for receiving said sign mounting means therein, said channel member having an inner leg and an outer leg, said legs being spaced apart and interconnected by a base member, a latching member pivotally attached to said bracket for pivotal movement between a first position wherein said latching member extends across the space between said inner and outer legs of said channel member and a second position wherein said latching member is spaced apart from said outer leg of said channel member;

resilient biasing means biasing said latching member toward said first position wherein said channel member and said latching member cooperate to at least partially circumscribe said sign mounting means after said sign mounting means has been positioned between said inner and outer legs in order to retain said sign mounting means therebetween.

9. The improvement according to claim 8, wherein said latching member includes at least one abutment portion thereon adapted to abuttingly engage said sign mounting means, said abutment portion and said resilient biasing means cooperating to resiliently urge said sign mounting means against said outer leg when said sign mounting means is positioned in said channel member between said inner and outer legs and when said latching member is in said first position.

10. The improvement according to claim 9, wherein said sign attachment means includes a pair of said channel members spaced-apart from each other and a pair of said latching members, each of said latching members being associated with one of said channel members, said resilient biasing means and said latching members being adapted to resiliently allow said pivotal movement of said sign while maintaining at least one of said latching members in said partially circumscribing relationship with said sign mounting means.

11. The improvement according to claim 10, wherein said pair of latching members are interconnected by a bridge portion for pivotal movement with one another, each of said latching members having a first aperture therethrough, said first apertures being mutually aligned to receive a pivot pin extending therethrough, said pivot pin being pivotally attached to said bracket.

12. A bracket according to claim 11, wherein said sign mounting means includes a horizontal cross member connected to said sign, said horizontal cross member being adapted to fit between said inner and outer legs with sufficient clearance to allow said pivotal movment of said sign.

13. A bracket according to claim 12, wherein said sign and sign stand assembly is pivotal through a total arc of approximately thirty degrees.

14. A bracket for mounting a sign on a sign stand, said sign having at least one sign mounting means thereon, said stand including a base, an upstanding frame structure, and resiliently yieldable means for normally maintaining said frame structure in a generally vertical position and resiliently permitting downward deflection of said frame structure relative to said base in either direction along a plane generally perpendicular to said sign when a sufficient first wind force is applied in a direction generally transverse to the plane of said sign, said bracket comprising:

bracket mounting means for mounting said bracket on said stand;

sign attachment means for attaching said sign mounting member to said bracket, said sign attachment means including means for allowing said sign to pivot laterally about a generally vertical axis generally parallel to said plane of said sign when a sufficient second wind force is applied in a direction generally parallel to said plane of said sign, said sign thereby being capable of pivoting to a position generally transverse relative to said second wind force in order to permit said downward deflection relative to said base along said plane generally perpendicular to said sign in response to said second wind force;

said sign attachment means further including at least one channel member in which said sign mounting means can be positioned, at least one latching member adapted for cooperating with said channel member to at least partially circumscribe said sign mounting means in order to retain said sign mounting means in said channel member; and said latching member being pivotally attached to said bracket for pivotal movement into and out of said cooperating relationship with said channel member, said sign attachment means further including resilient biasing means for biasing said pivotal latching member toward said cooperating relationship with said channel member, said latching member and said resilient biasing means cooperating to retain said sign mounting means in said channel member during said pivotal movement of said sign.

15. A bracket according to claim 14, wherein said latching member is pivotally attached to said inner leg, said resilient biasing means biasing said latching member toward said outer leg, said latching member further including an abutment portion thereon adapted for abutting engagement with said sign mounting means, said abutment portion and said resilient biasing means cooperating to resiliently urge said sign mounting means against said outer leg when said latching means is in said first position and said sign mounting means is positioned between said inner and outer legs.

16. A bracket according to claim 15, wherein said sign attachment means includes a pair of said channel members spaced apart from each other and a pair of said latching members, each of said latching members being pivotally attached to the inner leg of one of said channel members, said resilient biasing means and said latching members being adapted to resiliently allow said pivotal movement of said sign generally about one of said inner legs while maintaining the latching member pivotally attached to the other of said inner legs in said partially circumscribing relationship with said sign mounting means.

17. A bracket according to claim 16, wherein said pair of latching members are interconnected by a bridge portion for mutual pivotal movement, each of said latching members having a first aperture therethrough, said first apertures being mutally aligned to receive a pivot pin extending therethrough, said pivot pin being pivotally attached to said bracket.

18. A bracket according to claim 17, wherein said sign mounting means includes a horizontal cross member connected to said sign, said horizontal cross member being adapted to fit between said inner and outer legs of said channel members with sufficient clearance to allow said pivotal movement of said sign.

19. A bracket according to claim 18, wherein said sign is pivotal through a total arc of approximately thirty degrees.

20. In a sign and sign stand assembly said sign having at least one mounting means thereon, said sign stand including a frame member, a frame deflection means for resiliently deflecting said frame member downwardly generally along a predetermined plane in response to first wind forces exerted generally transverse to the plane of said sign, attachment means for attaching said mounting means to said frame member, the improvement comprising sign pivot means for permitting said sign to pivot laterally about a generally vertical axis in response to second wind forces exerted generally parallel to the plane of said sign, said pivoted sign being oriented generally transverse to said second wind forces in order to allow said frame member to deflect generally along said predetermined plane, said attachment means further including means for retaining said mounting means on said frame member during said pivoting of said sign and said deflection of said frame member, said mounting means including a generally horizontal cross-brace on said sign, said attachment means further including at least one channel means secured to said frame member for receiving said horizontal cross-brace therein, said channel means having a pair of channel legs sufficiently spaced apart to allow said horizontal cross-brace to pivot laterally therebetween, latching means pivotally cooperating with said channel means to engage and partially circumscribe said horizontal cross-brace, and resilient biasing means for biasing said pivotal latching means toward one of said channel legs, said resilient biasing means and said latching means cooperating to resiliently and yieldably bias said horizontal cross-brace toward said one of said channel legs.

21. In a sign and sign stand assembly, said sign having at least one generally horizontal cross-brace thereon, said sign stand including a frame member, frame deflection means for resiliently deflecting said frame member downwardly generally along a predetermined plane in response to first wind forces exerted generally transverse to the plane of said sign, the improvement comprising a pair of upwardly-presenting channel members secured to said frame member for receiving said horizontal cross-brace therein; each of said channel members having an inner leg spaced apart from an outer leg, the spaces between said legs being sufficiently wide to allow said horizontal cross-brace to pivot laterally therebetween, a pair of latching members pivotal relative to said frame member, resilient means for biasing said latching members toward abutting engagement with said horizontal cross-brace to biasingly urge said horizontal cross-brace against said outer leg, said resilient means yieldably allowing said horizontal cross-brace and said sign to pivot laterally about a generally vertical axis in response to second wind forces exerted generally parallel to the plane of said sign, said pivoted sign being oriented generally transverse to said second wind forces in order to allow said frame member to deflect generally along said predetermined plane.

22. The improvement according to claim 21, wherein a portion of at least one of said latching members at least partially circumscribe said horizontal cross-brace in order to retain said sign on said frame member during said lateral pivotal movement of said cross-brace and sign.

23. The improvement according to claim 22, wherein said sign is permitted to pivot laterally through a total arc of approximately 10 degrees to approximately 35 degrees.

24. The improvement according to claim 23, wherein said sign is permittd to pivot laterally through an arc of approximately 15 degrees on each side of the normal orientation of said sign, said normal orientation being generally perpendicular to said predetermined plane.

* * * * *

UNITED STATES PATENT AND TRADEMARK OFFICE

CERTIFICATE OF CORRECTION

PATENT NO. : 4,544,125

DATED : October 1, 1985

INVENTOR(S) : James R. Seely

It is certified that error appears in the above-identified patent and that said Letters Patent is hereby corrected as shown below:

Col. 5, Line 36; "attch" should be --attach--

Col. 7, Line 66; "pivotaly" should be --pivotally--

Col. 10, Line 20; "and sign stand assembly" shown in patent does not appear to be added to the claim through any type of amendment

Signed and Sealed this

*Twenty-ninth* Day of *July 1986*

[SEAL]

*Attest:*

DONALD J. QUIGG

*Attesting Officer* *Commissioner of Patents and Trademarks*